United States Patent
Gross et al.

[11] Patent Number: 6,141,992
[45] Date of Patent: Nov. 7, 2000

[54] ROTARY FIBERIZER HAVING TWO COOLING JACKETS AND AN AIR RING

[75] Inventors: Stephen Edward Gross, Littleton; Michael Dean Peterson, Parker, both of Colo.

[73] Assignee: Johns Manville International, Inc., Denver, Colo.

[21] Appl. No.: 09/220,728

[22] Filed: Dec. 24, 1998

[51] Int. Cl.[7] ............................................. C03B 37/08
[52] U.S. Cl. ................................................. 65/522; 65/523
[58] Field of Search ............................. 65/522, 523, 460

[56] References Cited

U.S. PATENT DOCUMENTS

| | | | |
|---|---|---|---|
| 2,609,566 | 9/1952 | Slayter | 65/522 |
| 3,245,768 | 4/1966 | Simmers | 65/522 |
| 3,249,413 | 5/1966 | Simmers | 65/522 |
| 3,393,986 | 7/1968 | Firnhaber | 65/523 |
| 3,622,293 | 11/1971 | Firnhaber | 65/522 |
| 3,785,791 | 1/1974 | Perry . | |
| 3,928,009 | 12/1975 | Perry . | |
| 4,353,724 | 10/1982 | Houston | 65/522 |
| 4,392,879 | 7/1983 | Taeuchi | 65/522 |
| 5,900,037 | 5/1999 | Yang | 65/522 |

*Primary Examiner*—John Hoffmann
*Attorney, Agent, or Firm*—John D. Lister

[57] ABSTRACT

In an apparatus and method of forming fibers from a fiberizable material, a molten fiberizable material is introduced into a rotating fiberizing rotor and passed through a plurality of holes in an annular peripheral sidewall of the fiberizing rotor to form primary fibers from the fiberizable material. The primary fibers are introduced into hot combustion gases and pressurized air in a fiberization zone adjacent an outer surface of the annular peripheral sidewall of the rotary fiberizing rotor to attenuate and form the primary fibers into fibers of the desired diameter and length. The hot combustion gases are discharged from an annular air cooled burner and the pressurized air, which is discharged form an annular air ring, is the same pressurizes air used to cool the annular air cooled burner.

9 Claims, 1 Drawing Sheet

ROTARY FIBERIZER HAVING TWO COOLING JACKETS AND AN AIR RING

BACKGROUND OF THE INVENTION

The present invention relates to a rotary fiberization process and apparatus and, in particular, to a rotary fiberization process and apparatus which utilizes a rotary fiberizer equipped with a burner/air ring assembly wherein pressurized air is used to cool an annular air cooled burner and then supplied to an air ring where it is discharged into the fiberization zone of the process at a high velocity.

The use of high velocity pressurized or compressed air to augment rotary glass fiberization processes is common in the glass fiber industry. The rotary fiberizers of these processes employ rotary fiberizing rotors and air rings. Molten glass is introduced into the rotating fiberizing disks and fiberized by passing outward through orifices in the peripheral sidewalls of the fiberizing rotors. In the air rings, high pressure air is distributed by means of an annular manifold to narrow slots or small diameter orifices an discharged through those narrow slots or small diameter orifices into the fiberization zones of the processes adjacent the outer surfaces of the fiberizing disk sidewalls. The constrictions caused by these narrow slots or small diameter orifices are such as to impart high velocities to the air, approaching or slightly exceeding sonic velocities, as the air exits the manifolds through the slots or orifices and enters the fiberization zones of the processes. The momentum of the high velocity air in the fiberization zones is transferred to the glass fiber primaries as the glass fiber primaries are spun from the rotating fiberizing rotors used in these processes. This momentum accelerates the glass fiber primaries to higher attenuation velocities and attenuates the glass fibers to finer diameter fibers.

However, the effects of air rings on these processes is not all positive. The high velocity air jets from the air rings aspirate or draw considerable amounts of ambient air into the fiberization zones of these processes and there are several drawbacks to this phenomenon. First, an undetermined portion of the momentum of the air jets is consumed during the process of accelerating the ambient air as it is pulled into the fiberization zones by the air jets. However, a second, and more important effect, is the cooling effect that occurs on the outer surfaces of the rotor sidewalls from the flow of cool air over or adjacent the outer surfaces of the sidewalls.

One potential source of cool air that can be drawn into the fiberization zones of these processes is from the glass entry ports of the rotary fiberizer which permit the molten glass to be introduced into the rotating fiberizing rotor. The relatively cool ambient air can be drawn into the rotary fiberizer through these glass entry ports and from these ports over the upper edges of the rotating fiberizing rotors into the fiberization zones. This source of relatively cool ambient air if normally minimized by the use of natural gas burners which discharge hot combustion gases into the rotating fiberizing rotors. These natural gas burners both help to maintain the molten glass within the fiberizing rotors at a desired operating temperature and, through the operation of these burners at an air/gas throughput high enough to produce a slight positive pressure inside and above the fiberizing rotor, these burners also function to prevent or greatly reduce the amount of cool ambient air entering the rotary fiberizer through the entry port.

Another source for relatively cool ambient air to enter the fiberization zones is more critical. Due to the high rotational speeds of the fiberizing rotors, which typically rotate at over two thousand revolutions per minute, the bottom surfaces of the fiberizing rotors function like a fan and accelerate air radially outward off the bottom surfaces of the rotors. Studies indicate that this ambient air is drawn around the lower peripheral edges of the fiberizing rotors and upward along the rotor sidewalls, generally in the form of recalculation eddies, by the aspirating effects of the air being discharged from the air ring. The flow of the ambient air upward along the rotor sidewalls excessively cools the lower portions of the rotor sidewalls and create turbulent regions adjacent the lower portions of the rotor sidewalls that preclude the use of the lower portions of the rotors for fiberization thereby reducing the potential production rates of the fiberizing rotors.

A solution commonly used by the industry to solve this more critical problem, involves the placement of auxiliary burners concentrically above the fiberization zones that discharge annular streams of hot combustion gases downward and between the outer peripheral surfaces of the rotor sidewalls and the air rings. The momentum of the hot combustion gases from these burners contribute some to the attenuation of the primary fibers. However, typically, the contribution of the momentum of the hot combustion gases to the attenuation of the primary fibers relative to the attenuation caused by the momentum of the high velocity air jets from the air rings is relatively minor. The primary function of the hot combustion gases from the burners is to provide a source of hot gases to the fiberization zones with velocity vectors directed into the fiberization zones to reduce or eliminate the amount of inspirated air. This permits the use of the entire rotor sidewalls for fiberization by keeping more uniform vertical temperature profiles across the rotor sidewalls and by reducing or eliminating the eddies mentioned above.

However, the burners currently used to provide the hot combustion gases for the fiberization zones are heavy, massive refractory lined burners. While the refractory lining materials enable these refractory lines burners to function at the elevated temperatures required, the refractory lining materials in these burners add significantly to both the weight and the size of these burners. For example, one of these refractory lined burners, used with a fiberizing rotor that is above twelve inches in diameter, can weigh about twelve hundred pounds and have an outside diameter that is about twice the diameter of the fiberizing rotor. Thus, although these burners are commonly used in rotary fiberizers having fiberizing rotors ranging from about eight to fifteen inches in diameter, the weight and size that would be required for such burners in rotary fiberizers using larger diameter rotary fiberizing rotors (e.g. fiberizing rotors ranging from about eighteen to thirty inches in diameter) has been prohibitive. As a result, although the use of larger diameter fiberizing rotors (fiberizing rotors greater than fifteen inches in diameter) has increased the production capacities of rotary fiberizers, the inability to supply the fiberization zones of these rotary fiberizers with hot combustion gases to prevent or greatly reduce the inspiration of ambient air into the fiberization zones has precluded the full attainment of the production increases which would otherwise have ben obtained through the use of the larger diameter fiberizing rotors. Thus, there has been a need to provide a lighter weight burner of smaller dimensions for use in rotary fiberizers having fiberizing disks greater than fifteen inches in diameter of increase the production capacities of such rotary fiberizers.

SUMMARY OF THE INVENTION

The rotary fiberizer and method of the present invention includes a rotating fiberizing rotor for forming fibers from a molten fiberizable material and a burner/air ring assembly. A molten fiberizable material (e.g. glass) is fed into the fiberizing rotor through a glass entry port. The centrifugal forces generated by the rotation of the fiberizing rotor then cause the molten fiberizable material in the fiberizing rotor to pass outward through a pluraltiy of fiberizing holes in an annular peripheral sidewall of the fiberizing rotor to form primary fibers from the fiberizable material. The primary fibers exiting the fiberizing orifices are introduced directly into a fiberization zone which surrounds the fiberizing rotor. In the fiberization zone which is maintained at an elevated temperature by the hot combustion gases from the burner of the of burner/air ring assembly, the primary fibers are attenuated and formed into finer diameter fibers by the momentum of the high velocity air jets or streams discharged from the air ring of the burner/air ring assembly.

The burner/air ring assembly is concentrically mounted relative to the fiberizing rotor and includes an annular air cooled burner and an annular air ring. The annular air cooled burner has a annul discharge slot or series of slots for discharging hot combustion gases in a generally downward direction into the fiberization zone adjacent an outer surface of the peripheral wall of the fiberizing rotor to maintain the fiberization zone at the temperature required for the proper attenuation of the primary fibers. The annular air ring has an annular discharge slot, slots or orifices located radially outward from the outer surface of the peripheral wall of the fiberizing rotor for discharging high volumes of pressurized air in high velocity jets or streams (typically approaching or slightly exceeding sonic velocities) in a generally downward direction into the fiberization zone to attenuate the primary fibers. The annular combustion chamber of the burner is made of high temperature resistant alloy and is provided with a cooling jacket for controlling the temperature of combustion chamber walls so that the combustion chamber of the burner does not have be lined with a refractory material. Pressurized air is introduced into the cooling jacket, circulated through the cooling jacket, and discharged from the cooling jacket into the annular air ring from which the pressurized air is discharged through the annular discharge slot, slots or orifices of the annular air ring into the heated fiberization zone to attenuate the primary fibers.

With the apparatus and method of the present invention, the need for a burner with a refractory lined combustion chamber is eliminated. The elimination of the need for a burner with a refractory line combustion chamber greatly reduces both the weight and size of the burner used in the burner/air ring assembly of the present invention and permits the use of the burner/air ring assembly of the present invention in rotary fiberizers employing large diameter fiberizing rotors e.g. fiberizing rotors eighteen to thirty or more inches in diameter as well as in rotary fiberizers employing smaller diameter fiberizing rotors. Thus, the added production potential of larger diameter fiberizing rotors can now be more fully realized. In addition, by using the same pressurized air for the combustion chamber coolant in the burner and the high velocity air jets or streams of the air ring, the added operating costs that would have ben incurred by using a second air supply to cool the burner is eliminated.

While air cooled burners exist which are cooled by the incoming combustion air that is burned in the combustion chambers of the burners, for safety reasons, such burners mix the combustion air with the fuel (typically natural gas) in the combustion chambers and do not produce the hotter more uniform flame patterns of burners which use premixed air/fuel supply systems. Thus, the method and burner/air ring assembly of the present invention, enable the use of air cooled burners with premixed air/fuel supply systems for a hotter, more uniform flame pattern without the need for a second air supply to cool the burner.

DESCRIPTION OF THE PREFERRED EMBODIMENTS

Figure 1:
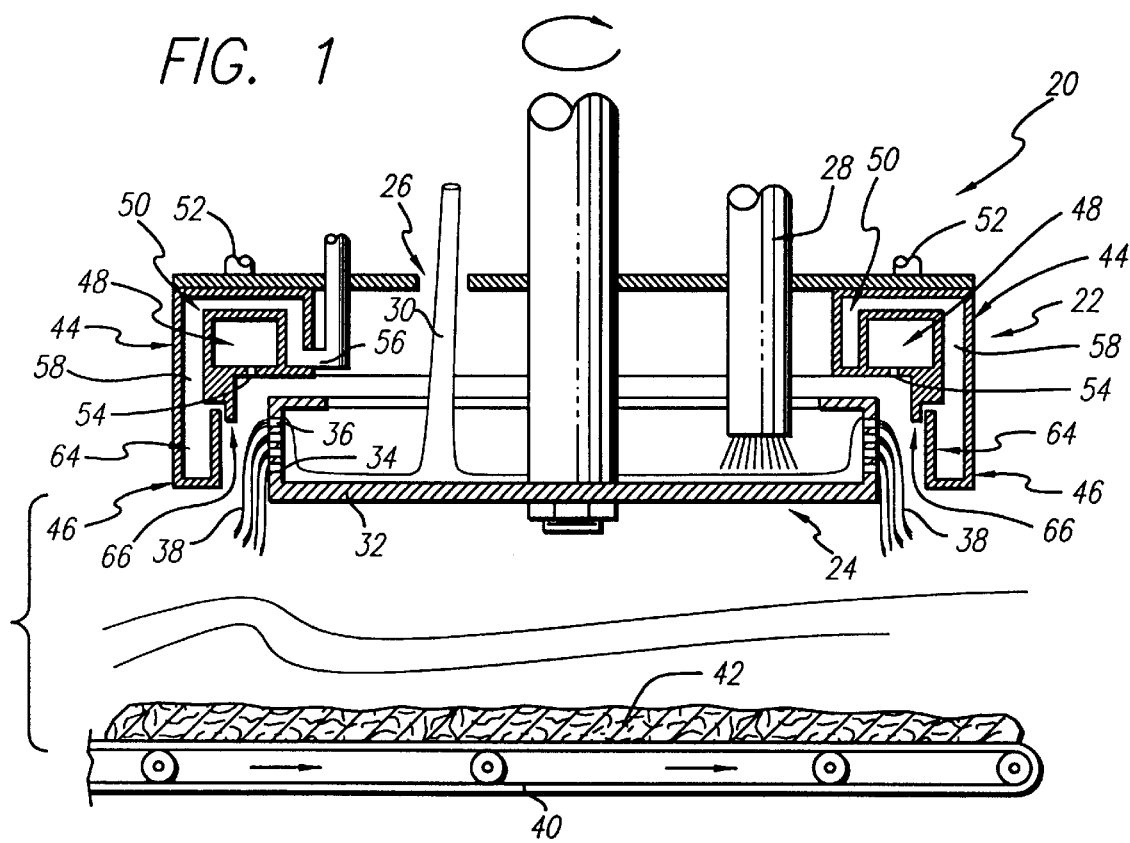
FIG. 1 is a schematic vertical cross section through one fiberizing station of a rotary fiberizing operation of the present invention.

FIG. 1 shows a rotary fiberizer 20 which employs the burner/air ring assembly 22 of the present invention. The rotary fiberizer 20 includes a rotating fiberizing rotor 24, a molten fiberizable material entry port 26, preferably one or more natural gas burners 28, and the burner/air ring assembly 22. A stream 30 of a molten fiberizable material, such as but not limited to glass, is introduced into the rotating fiberizing rotor 24 through the entry port 26. As the stream 30 of molten fiberizable material strikes the upper surface of the bottom wall 32 of the fiberizing rotor 24, the centrifugal forces generated by the rotation of the fiberizing rotor 24 causes the molten fiberizable material to flow outwardly across the upper surface of the bottom wall 32 of the fiberizing rotor and up the annular peripheral sidewall 34 of the fiberizing rotor. The annular peripheral sidewall 34 of the fiberizing rotor is provided with a plurality, typically several thousand to tens of thousands, of very small diameter fiberizing orifices or holes 36 which are typically between 0.018 inches and 0.024 inches in diameter. The centrifugal forces generated by the rotation of the fiberizing rotor 24 causes the molten fiberizable material to pass outwardly through the fiberizing orifices or holes 36 to form primary fibers. Upon exiting the fiberizing orifices 36, these primary fibers are introduced directly into a heated fiberization zone that surrounds the outer surface of the peripheral sidewall 34 of the fiberizing rotor 24 where the primary fibers are further attenuated by high velocity air jets or streams into fibers 38. The fibers 38 then pass down through a collection chamber where a binder is typically applied to the fibers. Normally, the fibers 38 are then collected on a moving air permeable conveyor 40 (air is drawn down through the conveyor) or other collection surface to form a mat or blanket 42 of randomly oriented fibers.

The burner(s) 28 used in the preferred embodiment of the invention are operated at an air/gas throughput high enough to cause a slight positive pressure within and above the fiberizing disk 24 to prevent or greatly reduce the amount of relatively cool ambient air drawn into the rotary fiberizer through the entry port 26. In addition, to preventing the ingress of cool ambient air through the entry port 26, the heat from the burner(s) 28 helps to maintain the molten fiberizable material within the fiberizing rotor at the desired temperature and viscosity for fiberization through the fiberizing orifices or holes 36 in the sidewall 34 of the fiberizing rotor 24.

As shown in FIG. 1, the burner/air ring assembly 22 is mounted concentrically with respect to the fiberizing rotor 24. The burner/air ring assembly 22 includes an air cooled burner 44 and an air ring or manifold 46. While FIG. 1 illustrates the burner/air ring assembly 22 of the present invention and the concentric mounting of the burner/air assembly relative to the fiberizing rotor 24, FIGS. 2 and 3 better illustrate the details of two preferred embodiments of the burner/air ring assembly 22.

The air cooled burner 44 includes an annular combustion chamber 48 with a cooling jacket 50; an entry port or ports 52 for introducing air and fuel into the combustion chamber 48; and annular discharge orifice or slot or slits 54 for discharging hot combustion gases from the combustion chamber 48; an entry port or ports 56 (only one of which is shown) for introducing pressurized air into the cooling jacket 50; and an exit slot 58 or exit orifices or ports 60 for discharging the pressurized air into the air ring 46.

Figure 2:
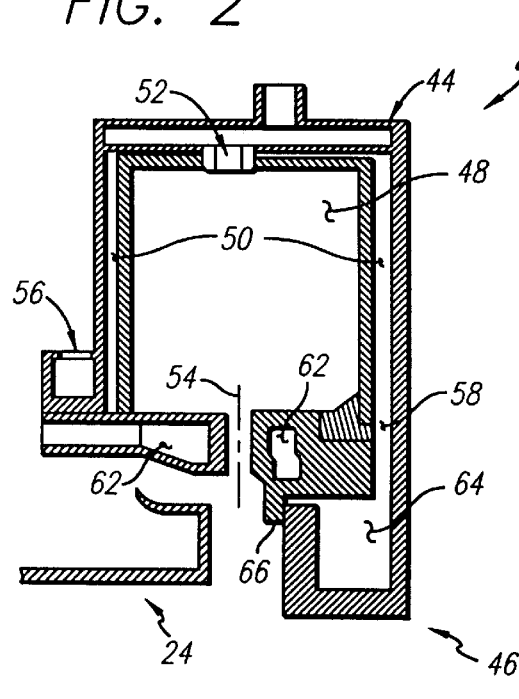
FIG. 2 is a schematic vertical cross section through a first burner/air ring assembly of the present invention.
Figure 3:
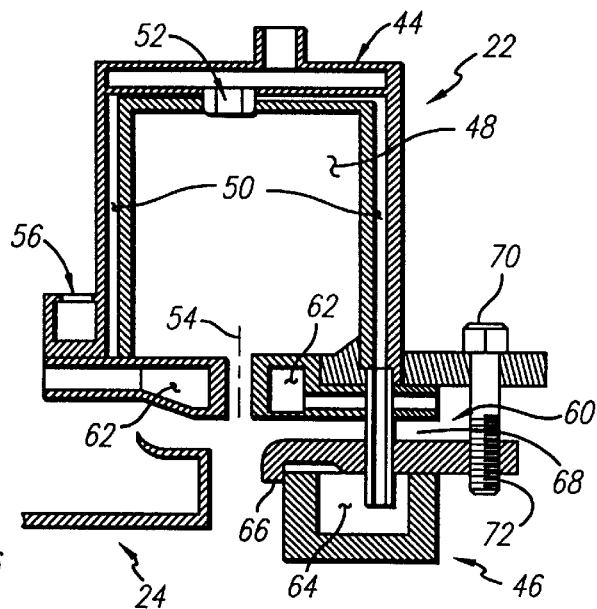
FIG. 3 is a schematic vertical cross section through a second burner/air ring assembly of the present invention.

As best shown in FIGS. 2 and 3, the annular combustion chamber 48 of the air cooled burner 44 has an annular double walls cooling jacket or housing 50 that encloses the radially inner and outer sidewalls of the annular combustion chamber 48 as well as the upper wall of the combustion chamber 48. High volumes of compressed or pressurized air are introduced into the cooling jacket through the entry ports 56 located on the inside of the burner 44. The pressurized air then circulates upward through the cooling jacket 50 along the inside wall of the combustion chamber, outward across the upper wall (ceiling) of the combustion chamber, and downward along the outer wall of the combustion chamber where the pressurized air is discharged into the air ring 46 through the exit slot 58 (FIG. 2) or exit orifices or ports 60 (FIG. 3).

The use of a cooling jacket 50 with large volumes of pressurized air passing through the cooling jacket as a coolant eliminates the need to provide the combustion chamber 48 with a lining of a heavy, bulky refractory material and thereby reduces both the weight and the dimensions of the burner/air ring assembly 22. For example, it is estimated that a burner with a refractory lined combustion chamber used in conjunction with a fiberizing rotor eighteen inches in diameter would weigh about nine hundred pounds and have an outside diameter of about twenty seven inches to about thirty two inches while a burner 44 used in the burner/air ring assembly 22 of the present invention would weigh only about one hundred fifty pounds and have an outside diameter of about twenty two inches to about twenty six inches. As can be seen from this example, the use of an air cooled burner 44 in the burner/air ring assembly 22 of the present invention results in a considerable reduction in the weight and size of the burner 4 and thus the burner/air ring assembly 22.

Air and fuel (typically natural gas) are introduced into the combustion chamber 48 through the air and fuel entry ports 52, ignited and burned in combustion chamber 48. Hot combustion gases are discharged from the combustion chamber into the fiberization zone surrounding the fiberizing rotor 24 through the annular discharge orifice, slot or slots 54. The annular discharge orifice, slot or slots 54 are: preferably water cooled by an annular cooling jacket 62, concentrically located relative to the fiberizing rotor 24, and discharge hot combustion gases into the fiberization zone to maintain the fiberization zone at the desired or required temperature for proper fiberization of the primary fibers exiting the fiberizing holes 36. Preferably, the air and fuel are premixed to form an air/fuel mixture prior to their introduction into the combustion chamber to produce a hotter more uniform flame pattern.

The air ring 46 includes an air distribution chamber 64 and an air discharge slot, orifice, orifices or slots 66, preferably a slot, which directs jets or streams of high velocity (typically approaching or slightly exceeding sonic velocities) heated pressurized air, supplied to the air ring 46 from the cooling jacket 50, from the air ring 46 into the fiberization zone in a generally downward direction. The impact of the high volumes (typically about fifty cubic feed per minute to about twelve hundred cubic feet per minute) of heated air on the primary fibers exiting the fiberizing orifices 36 in the heated atmosphere of the fiberization zone attenuates the primary fibers into the finer diameter fibers 38 which are then collected.

In the burner/air ring assembly 22 of FIG. 2, the burner 44 and the air ring 46 are integral and there is not annular air gap between the burner 44 and the air ring 46. In the burner air ring assembly 22 of FIG. 3, the burner 44 and the air ring 46 can be vertically adjusted relative to each other to form an annular air gap 68 between the bottom surface of the burner 44 and the upper surface of the air ring 46. The annular air gap 68 and the size of the annular air gap 68 is used in certain fiberization operations to affect the fiberization of the primary fibers exiting from the fiberizing rotor. The means for adjusting the burner 44 and the air ring 46 vertically relative to each other can be any conventional adjustment assembly, such as but not limited to bolts 70 passing through and from the burner or air ring component of the burner/air ring assembly into threaded holes 72 in the other component of the burner/air ring assembly where by the bolts can be threaded further into or partially unthreaded from the threaded holes 72 to adjust and set the size of the annular air gap 68.

The relatively light weight burner/air ring assembly 22 of the present invention is made of a high temperature resistant alloy such as but not limited to Inconel, Hastaloy, another high temperature resistant stainless steel, or another high temperature resistant alloy, such as, by way of example, an alloy capable of operating at temperatures in excess of 1850° F. As mentioned above, with the air cooled burner 46 that is cooled by the high volume of pressurized air that is eventually discharged from the air ring 46, the burner 46 of the burner/air ring assembly 22 of the present invention does not require the use of a refractory lined combustion chamber thereby reducing both the weight and dimensions of the burner/air assembly 22 so that the burner/air ring assembly can be used in rotary fiberizers 20 with large diameter fiberizing rotors 24.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. In a rotary fiberizer comprising a rotating fiberizing rotor for forming fibers from a molten fiberizable material; the fiberizing rotor having an annular peripheral wall with a plurality of fiberizing holes therein through which the molten fiberizable material passes to form primary fibers from the fiberizable material; and a means for feeding a molten fiberizable material into the fiberizing rotor; the improvement comprising:

a burner/air ring assembly; the burner/air ring assembly having an annular air cooled burner and an annular air ring; the annular air cooled burner having an annular discharge means for discharging hot combustion gases in a generally downward direction into a fiberization zone adjacent an outer surface of the peripheral wall of the fiberizing rotor; the annular discharge means for discharging hot combustion gases from the burner having an annular cooling jacket for circulating water to cool the annular discharge means; the annular air cooled burner having a combustion chamber with a combustion chamber cooling jacket for controlling the temperature of inner and outer sidewalls and an upper wall of the combustion chamber which are made of a high temperature resistant alloy and not lined with a refractory material; the annular air ring having an annular discharge means located radially outward from the outer surface of the peripheral wall of the fiberizing rotor for discharging pressurized air in a generally downward direction into the fiberization zone; inlet means for introducing pressurized air into the combustion chamber cooling jacket to circulate the pressurized air through the combustion chamber cooling jacket; and outlet means connecting the combustion chamber cooling jacket to an air distribution chamber of the annular air ring for discharging the pressurized air form the combustion chamber cooling jacket into the annular air ring from which the pressurized air is discharged through the annular discharge means of the annular air ring.

2. The rotary fiberizer according to claim 1, wherein: the high temperature resistant alloy of the combustion chamber walls is capable of operating at a temperature of about 1850° F. or greater.

3. The rotary fiberizer according to claim 1, wherein: the annular air cooled burner and the annular air ring are integral.

4. The rotary fiberizer according to claim 3, wherein: the high temperature resistant alloy of the combustion chamber walls is capable of operating at a temperature of about 1850° F. or greater.

5. In a rotary fiberizer comprising a rotating fiberizing rotor for forming fibers from a molten fiberizable material; the fiberizing rotor having an annular peripheral wall with a plurality of fiberizing holes therein through which the molten fiberizable material passes to form primary fibers from the fiberizable material; and a means for feeding a molten fiberizable material into the fiberizing rotor; the improvement comprising:

a burner/air ring assembly; and burner/air ring assembly having an annular air cooled burner and an annular air ring; the annular air cooled burner having an annular discharge means for discharging hot combustion gases in a generally downward direction into a fiberization zone adjacent an outer surface of the peripheral wall of the fiberizing rotor; and annular air cooled burner having a combustion chamber with a cooling jacket for controlling the temperature of inner and outer sidewalls and an upper wall of the combustion chamber; the annular air ring being spaced below the annular air cooled burner to form an annular gap bewteen the annular air ring and the annular air cooled burner through which ambient air can be drawn into the fiberization zone; the annular air ring having an annular discharge means located radially outward from the outer surface of the peripheral wall of the fiberizing rotor for discharging pressurized air in a generally downward direction into the fiberization zone; inlet means for introducing pressurized air into the combustion chamber cooling jacket to circulate the pressurized air through the combustion chamber cooling jacket; and outlet means connecting the combustion chamber cooling jacket to the annular air ring for discharging the pressurized air from the combustion chamber cooling jacket into an air distribution chamber of the annular air ring from which the pressurized air is discharged through the annular discharge means of the annular air ring.

6. The rotary fiberizer according to claim 5, including: means for adjusting the spacing between the annular air ring and the annular air cooled burner to control the size of the gap between the annular air ring and the annular air cooled burner.

7. The rotary fiberizer according to claim 6, wherein: the combustion chamber walls are made of a high temperature resistant alloy capable of operating at a temperature of about 1850° F. or greater.

8. The rotary fiberizer according to claim 7, wherein: the combustion chamber wall are not lined with a refractory material.

9. The rotary fiberizer according to claim 5, wherein: the annular discharge means for discharging hot combustion gases from the annular air cooled burner has an annular cooling jacket for circulating water to cool the annular discharge means.

* * * * *